Patented Mar. 16, 1954

2,672,452

UNITED STATES PATENT OFFICE 2,672,452

MANUFACTURE OF SPHERICAL PARTICLES

Charles Wankat, Brookfield, Ill., assignor to Universal Oil Products Company, Des Plaines, Ill., a corporation of Delaware No Drawing. Application November 17, 1952, Serial No. 321,044

20 Claims. (Cl. 252—448)

This application is a continuation-in-part of my co-pending application Serial Number 205,223, filed January 9, 1951, now abandoned.

This invention relates to the manufacture of spherical particles and more particularly to an improvement in the process of manufacturing inorganic oxide particles of substantially spherical or spheroidal shape.

A recent method for the manufacture of spherical particles of inorganic oxides entails dispersing droplets of a sol in a water immiscible suspending medium wherein the droplets set into hydrogel spheres. During use in the process, the suspending medium, particularly when operated at an elevated temperature, undergoes deterioration and becomes unsatisfactory for further use to produce substantially spherical gel particles. The interfacial tension between the suspending medium and the sol decreases during this use and results in particles which are not substantially spherical but instead are flat or ellipsoidal.

Another disadvantage resulting from the continued use of the suspending at elevated temperature in this process is that the suspending medium tends to be retained by the spheres to a greater extent than when using the fresh suspending medium. This results in a film of suspending medium on the gel particles and interferes with subsequent treatment of the gel particles with aqueous solutions. The film of suspending medium prevents efficient contact between the aqueous solution and the gel particles, with the result that either a poorer product is obtained or more aqueous solution is required to effect the desired treatment.

The present invention is directed to a novel method of retarding and/or preventing deterioration of the suspending medium and thereby to permit the use thereof for a considerably longer period of time than otherwise, with the resultant increased efficiency and improved economics of the sphere manufacture process.

In one embodiment the present invention relates to the process which comprises forming inorganic oxide spheres in a water immiscible suspending medium containing an aromatic hydroxy compound.

In a specific embodiment the present invention relates to the process which comprises forming silica spheres in an oil bath containing an alkylated phenol.

In another specific embodiment the present invention relates to the process which comprises introducing droplets of an alumina sol and hexamethylene tetramine into hydrocarbon oil containing a tri-alkyl phenol and maintained at an elevated temperature, therein causing the droplets to set into hydrogel spheres, and subsequently separating said spheres from the hydrocarbon oil.

From the heretofore description it is apparent that the novel features of the present invention may be utilized in the formation of hydrogel spheres from any suitable sol having the characteristic of setting into a gel. The sol may be formed from compounds of aluminum, silicon, titanium, zirconium, thorium, cerium, etc. The present invention is particularly applicable to the formation of gels comprising alumina or silica. The invention also may be utilized in the formation of cogels comprising two or more of these compounds.

The spheres may be utilized for any suitable purpose including dehydrating agents, contacting agents, catalysts, etc. and are particularly preferred for use in the preparation of catalysts for the conversion of organic compounds by impregnating or otherwise compositing therewith one or more active catalytic components. For example, in the manufacture of catalysts which are particularly suitable for use in the cracking of hydrocarbons, silica spheres may be impregnated or otherwise composited with an oxide of aluminum, magnesium, zirconium, vanadium, etc. or mixtures thereof. In the manufacture of catalysts which are particularly suitable for hydrogenation or dehydrogenation reactions, alumina spheres may be impregnated with an oxide of chromium, molybdenum, vanadium, tungsten, titanium, thorium, etc. or mixtures thereof.

In the manufacture of catalysts which are particularly suitable for the reforming of gasoline or naphtha in order to improve the antiknock properties thereof, alumina may be impregnated or otherwise composited with one or more of the metals or compounds of the noble metals, rare metals or those in the left hand column of group 6 of the periodic table. The alumina is particularly suitable for compositing with platinum, with or without combined halogen, and used for the reforming of gasoline or naphtha.

In the manufacture of silica spheres, a suitable silica compound, such as an alkali metal silicate and particularly water glass, is commingled with a suitable acid, such as sulfuric acid, hydrochloric acid, etc. and the resultant mixture or sol is passed in finely divided form into the water immiscible suspending medium. In a preferred method, droplets of the sol are passed into a hydrocarbon oil bath. The concentration of water glass and acid are controlled so that the sol sets into firm hydrogel spheres. The suspending medium preferably is maintained at room temperature although in some cases elevated temperatures may be employed.

Any suitable suspending medium may be utilized in the manufacture of silica, alumina and the other inorganic oxides of the present invention. Preferred suspending mediums include Nujol, kerosene, selected fractions of gas oil, etc. It generally is preferred to utilize a suspending medium having a density less than that of the sol so that the sol may be dropped into the top of the suspending medium and the spheres are withdrawn from the bottom thereof. However, it is understood that a suspending medium having a density higher than that of the sol may be employed and the sol, in this embodiment, would be introduced at the bottom of a confined body of the fluid, whereby the droplets will rise slowly to the surface of the suspending medium, setting into a hydrogel during passage therethrough, and being withdrawn at the top of the suspending medium.

In accordance with the present invention, an aromatic hydroxy compound is added to the suspending medium and, as will be shown by the following examples, the addition of the aromatic hydroxy compound serves to retard lowering of the interfacial tension between the sol and suspending medium, and thereby serves to prolong the useful life of the suspending medium to produce gel particles of substantially spherical shape. Further, the addition of the aromatic hydroxy compound serves to reduce the film of oil on the spheres which in turn serves to facilitate subsequent washing of the spheres.

Referring again to the manufacture of silica spheres and utilizing hydrocarbon oil as the suspending medium, a particularly preferred method of removing the spheres from the forming zone is by means of a circulating stream of water positioned beneath the oil. The spheres are continuously withdrawn from the forming chamber and are directed to another zone wherein the spheres are washed with water to remove the soluble compounds as, for example, sodium present in the water glass, acidic components introduced by the acid, etc. As hereinbefore set forth, the incorporation of the aromatic hydroxy compound in the oil suspending medium will reduce the amount of oil retained on the spheres and thereby will improve the efficiency of the water washing treatment.

In the manufacture of alumina spheres, an alumina sol is commingled with a suitable organic basic compound reactable therewith to form gel particles, and the resultant mixture is then dispersed in finely divided form into the suspending medium. Any suitable alumina sol may be utilized in accordance with the present invention. In a preferred method the alumina sol is prepared from a chloride of aluminum although, it is understood that other aluminum salts, such as a nitrate of aluminum, etc. may be utilized but not necessarily with equivalent results.

Any suitable organic basic compound may be used in accordance with the present invention. Hexamethylene tetramine is particularly preferred. Other organic basic compounds include the reaction product of ammonia with acetaldehyde, propionaldehyde, etc. or ammonium acetate and preferably a mixture of ammonium acetate and ammonium hydroxide, the mixture having a pH of below about 8.5., etc.

The hexamethylene tetramine preferably is prepared as an aqueous solution containing from about 15% to about 40% by weight of hexamethylene tetramine. The solution of alumina sol and the solution of hexamethylene tetramine are commingled and, in a preferred embodiment of the invention, droplets thereof are passed into the suspending medium. In general it is preferred to use equal volumes of the sol solution and of the hexamethylene tetramine solution. However, it is understood that the ratios of these solutions may vary considerably and thus range to about 5 volumes or more of one solution per 1 volume of the other solution.

The mixture of sol and hexamethylene tetramine solution preferably are dropped at room temperature or below into the suspending medium maintained at an elevated temperature which generally is above room temperature and preferably is from about 120° to about 220° F. and still more preferably of from about 190° to about 210° F. The volume of suspending medium employed should be sufficient to allow the required time for the droplets to set into firm hydrogel spheres.

As hereinbefore set forth, the oil used in the forming zone deteriorates with use and results in flat or ellipsoidal pellets. In accordance with the present invention, an aromatic hydroxy compound is added to the oil used in the forming zone. In one embodiment of the invention the aromatic hydroxy compound may be added to the oil either before or after introduction into the forming zone and, when desired, additions of the aromatic hydroxy compound to the oil may be made periodically.

Any suitable aromatic hydroxy compound may be utilized for incorporation in the suspending medium. While unsubstituted aromatic hydroxy compounds may be used, including phenol, catechol, resorcinol, hydroquinone, pyrogallol, oxyhydroquinone, phloroglucinol, naphthol, polyhydroxy naphthols including 1,5-dihydroxynaphthalene, 2,5-dihydroxynaphthalene, 2,7-dihydroxynaphthalene, 1,2,5-trihydroxynaphthalene, 2,5,7-trihydroxynaphthalene, etc., it is preferred to utilize substituted aromatic hydroxy compounds. Preferred substituted compounds comprise those having at least one alkyl group attached to the nucleus of the aromatic ring. Also, it is preferred that at least one of the alkyl substituents comprises a branched chain configuration. Mono-alkylated compounds include isopropyl phenol, tertiary butyl phenol, tertiary amyl phenol, tertiary hexyl phenol, tertiary heptyl phenol, tertiary octyl phenol, and branched chain alkyl substituents containing from about 9 to about 20 carbon atoms per group preferably containing a tertiary alkyl configuration, similarly substituted hydroquinone including tertiary butyl hydroquinone, tertiary amyl hydroquinone, tertiary hexyl hydroquinone, similarly substituted catechol, the substituent group preferably being in a position para to one of the hydroxyl groups, etc., similarly substituted naphthols and polyhydroxy naphthalenes, etc. Dialkylated compounds include 2,5-dialkyl phenols in which the alkyl groups contain from one to about 20 carbon atoms per group and at least one of the alkyl groups is of branched chain structure, including such compounds as 2-tertiary butyl-4-methylphenol, 2-tertiary amyl-4-methylphenol, 2-tertiary hexyl-4-methylphenol, 2-tertiary heptyl-4-methylphenol, 2-tertiary octyl-4-methylphenol, 2,5-ditertiary butyl phenol, 2,5-ditertiary amyl phenol, 2,5-ditertiary hexyl phenol, 2,5-ditertiary heptyl phenol, 2,5-ditertiary octyl phenol, etc., similarly substituted naphthols and polyhydroxy naphthalenes, etc.

Particularly preferred alkyl aromatic compounds comprise trialkylated phenols including 2,6 - ditertiary butyl - 4 - methylphenol, 2,4 - dimethyl-6-tertiary butyl phenol, 2,6-dimethyl-4-tertiary butyl phenol, 2-methyl-4,6-ditertiary butyl phenol, 2,4,6-tritertiary butyl phenol and similarly substituted phenols in which the tertiary alkyl group contains from 5 to about 20 carbon atoms per group. It is understood that similarly substituted naphthols and polyhydoxy naphthalenes are comprised within this class.

Other substituted hydroxy aromatic compounds included within the scope of the present invention comprise hydroxy aromatic compounds containing an alkoxy group in addition to the hydroxyl group, as exemplified in such compounds as 2-tertiary butyl-4-methoxy phenol, 2-tertiary butyl-4-ethoxy phenol, 2,5-ditertiary butyl-4-alkoxy phenols, etc. Also included is the mixture at present being marketed commercially as UOP No. 1 Inhibitor and comprising a mixture of phenols and phenolic ethers, formed by the destructive distillation of hardwood and recovering a selected tar fraction therefrom boiling between about 450° and about 550° F. Still another class of compounds included within the scope of the present invention are those containing a heterocyclic ring attached to a phenolic ring as exemplified by such compounds as 5-hydroxy coumaran 2,2-dimethyl-5-hydroxy coumaran, 2,2-dimethyl-5-hydroxy-6-tertiary butyl coumaran, 2,2-dimethyl - 5 - hydroxy-6-tertiary amyl coumaran, etc. Still another class of substituted hydroxy aromatic compounds are those containing a nitrogen atom attached to the nucleus as exemplified by aminophenols and alkylated aminophenols, including particularly N, n-butyl-p-aminophenol and N, secondary-butyl-p-aminophenol, etc.

It is understood that the various hydroxy aromatic compounds hereinbefore set forth are not necessarily equivalent in their activity but all of them will serve to retard undesirable deterioration of the suspending medium. The hydroxy aromatic compound generally will be utilized in a concentration of from about 0.0001% to about 1% by weight of the oil and more particularly of from about 0.01% to about 0.5% by weight thereof. In most cases, the hydroxy aromatic compound will be readily soluble in the suspending medium, and therefore is readily incorporated therein. In other cases, it may be desirable to utilize a solvent which will facilitate solubility of the aromatic hydroxy compound in the oil. The use of a solvent also may be desirable when the hydroxy aromatic compound is a solid at room temperature as this will facilitate handling and incorporation thereof in the suspending medium. Any suitable solvent may be employed but must be one that will not adversely affect the spheres. Suitable solvents include alcohols, ethers, ketones, etc.

The spheres formed in the above manner generally are treated with aqueous solutions in subsequent handling as, for example, washing of the spheres with water or other aqueous solutions. As hereinbefore set forth, the addition of the aromatic hydroxy compound to the suspending medium will reduce the retention of the suspending medium on or in the spheres and thus will facilitate the subsequent aqueous treatment.

As a further means of retarding deterioration of the suspending medium, the forming step may comprise a closed zone which will exclude air and other constituents of the atmosphere from contacting the suspending medium. Preferably a blanket of nitrogen or other inert gas is maintained above the suspending medium and preferably is at a pressure at least slightly above atmospheric so that any leaks will be to the atmosphere instead of the reverse. This readily may be accomplished by introducing a continuous stream of nitrogen or other inert gas at a pressure of from about 2 to 10 pounds per square inch or more into the upper portion of the forming zone.

After treatment of the spheres in the manner herein set forth above, the spheres may be treated in any suitable manner. When used as adsorbent, contacting agent, etc., the spheres may be dried at a temperature of from about 200° to about 500° F. and then may be calcined at a temperature of from about 800° to about 1400° F. or more. When utilized as a support or carrier for catalyst, the spheres may be impregnated or otherwise composited with other components in any suitable manner and then calcined as aforesaid. In some cases it is desirable to dry and calcine the spheres, composite with the other components, and then further dry and calcine the spheres. When composited with one or more of the metals or compounds in groups 4, 5, 6 and 8 of the periodic table, the resultant catalysts are suitable for use in cracking, reforming, hydrogenation, dehydrogenation, cyclization, desulfurization, etc., of hydrocarbons or other organic compounds.

The following examples are introduced to illustrate further the novelty and utility of the present invention but not necessarily with the intention of unduly limiting the same.

*Example I*

The suspending medium used in this example was a Pennsylvania light spindle oil having an API gravity at 60° F. of 33° and a boiling range of 640° to 739° F. The fresh oil had an interfacial tension against water of 28.8 dynes/cm. This oil had a useful life of only about 8 days for the manufacture of alumina spheres and then had to be discarded because the pellets no longer were spherical but became flat or ellipsoidal.

An accelerated test has been devised to evaluate the effect of additives to the suspending medium. This test comprises subjecting the suspending medium containing additive to 100 pounds per square inch of oxygen pressure at 212° F. for 16 hours. This accelerated test simulates the conditions encountered in the forming step of the alumina sphere manufacturing process but is more severe due to the high oxygen pressure and thereby serves to evaluate the various additives without requiring a long time run in the plant. The results obtained by this test correlate well with those obtained in actual plant operation.

When tested in the above manner, the oil without additive descreased in interfacial tension against water to 15.5 dynes/cm. Upon the addition of 0.05% by weight of 2,6-di-tertiary butyl-4-methylphenol, the suspending medium, when tested in the above manner, had an interfacial tension against water of 27.5 dynes/cm.

It appears that an interfacial tension of about 20 dynes/cm. is critical and that oils having interfacial tension of below about 20 are unsatisfactory in producing substantially spherical pellets, while those having interfacial tension above 20 are satisfactory for this purpose. Thus it is seen that the addition of the 2,6-di-tertiary butyl-4-methylphenol served to maintain the oil above the critical limit of 20 and therefore the oil will be satisfactory for use for a considerably longer time.

*Example II*

0.1% by weight of 2-tertiary butyl-4-methoxyphenol was added to another sample of the oil and, after subjection to the conditions hereinbefore set forth, the oil had an interfacial tension against water of 21 dynes/cm. Here again it is seen that the addition of the aromatic hydroxy compound served to prolong the useful life of the oil.

*Example III*

0.1% by weight of 2,4-dimethyl-6-tertiary butyl phenol was added to another portion of the oil and, after subjection to the conditions hereinbefore set forth, the oil had an interfacial tension of 22.8 dynes/cm. Here again it is seen that the addition of the aromatic hydroxy compound served to prolong the useful life of the oil.

*Example IV*

0.1% by weight of UOP No. 1 Inhibitor was added to another portion of the oil and, after subjection to the conditions hereinbefore set forth, the oil had an interfacial tension of 22.7 dynes/cm. The UOP No. 1 Inhibitor is a tar fraction boiling between 450° and 550° F. obtained by the destructive distillation of hardwood. Again it is seen that the addition of the phenolic compound served to retard undesirable deterioration of the suspending medium.

*Example V*

0.2% by weight of N-n-butyl-p-aminophenol was added to another portion of the suspending medium and, after subjection to the conditions hereinbefore set forth, the oil had an interfacial tension of 21.3 dynes/cm. It is again seen that the addition of the hydroxy aromatic compound served to retard lowering of the interfacial tension of the suspending medium.

I claim as my invention:

1. In the forming of inorganic oxide spheres by converting a sol of said inorganic oxide to a hydrogel within a hydrocarbon oil suspending medium, wherein the interfacial tension between said sol and said oil decreases with use, the improvement which comprises incorporating in said oil from about 0.0001% to about 1% by weight of an aromatic hydroxy compound.

2. The improvement of claim 1 further characterized in that said aromatic hydroxy compound is an alkylated phenol.

3. The improvement of claim 1 further characterized in that said aromatic hydroxy compound is a trialkyl phenol.

4. In the forming of silica spheres by introducing droplets of silica sol into a hydrocarbon oil and therein causing the droplets to set to hydrogel spheres, wherein the interfacial tension between said sol and said hydrocarbon oil decreases with use, the improvement which comprises incorporating from about 0.0001% to about 1% by weight of a trialkylated phenol in said oil.

5. In the forming of silica spheres by introducing droplets of silica sol into a hydrocarbon oil and therein causing the droplets to set to hydrogel spheres, wherein the interfacial tension between said sol and said hydrocarbon oil decreases with use, the improvement which comprises incorporating in said oil from about 0.01% to about 0.5% by weight of 2,6-ditertiary butyl-4-methyl phenol.

6. In the forming of silica spheres by introducing droplets of silica sol into a hydrocarbon oil and therein causing the droplets to set to hydrogel spheres, wherein the interfacial tension between said sol and said hydrocarbon oil decreases with use, the improvement which comprises incorporating in said oil from about 0.01% to about 0.5% by weight of 2,4-dimethyl-6-tertiary butyl phenol.

7. In the forming of silica spheres by introducing droplets of silica sol into a hydrocarbon oil and therein causing the droplets to set to hydrogel spheres, wherein the interfacial tension between said sol and said hydrocarbon oil decreases with use, the improvement which comprises incorporating in said oil from about 0.01% to about 0.5% by weight of a hardwood tar distillate.

8. In the forming of silica spheres by introducing droplets of silica sol into a hydrocarbon oil and therein causing the droplets to set to hydrogel spheres, wherein the interfacial tension between said sol and said hydrocarbon oil decreases with use, the improvement which comprises incorporating in said oil from about 0.01% to about 0.5% by weight of 2-tertiary butyl-4-methoxyphenol.

9. In the forming of silica spheres by introducing droplets of silica sol into a hydrocarbon oil and therein causing the droplets to set to hydrogel spheres, wherein the interfacial tension between said sol and said hydrocarbon oil decreases with use, the improvement which comprises incorporating in said oil from about 0.01% to about 0.5% by weight of a p-aminophenol.

10. In a process of forming alumina spheres by introducing droplets of alumina sol and an organic basic compound reactable therewith to form gel particles into a hydrocarbon oil maintained at an elevated temperature and therein causing the droplets to set to hydrogel spheres, wherein the interfacial tension between said mixture and said hydrocarbon oil decreases with use, the improvement which comprises incorporating in said oil from about 0.0001% to about 1% by weight of an aromatic hydroxy compound.

11. In a process for the manufacture of alumina spheres by commingling alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.0001% to about 1% by weight of an alkylated phenol.

12. In a process for the manufacture of alumina spheres by commingling alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.01% to about 0.5% by weight of 2,6-ditertiary butyl-4-methylphenol.

13. In a process for the manufacture of alumina spheres by commingling alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.01% to about 0.5% by weight of 2,4-dimethyl-6-tertiary butyl phenol.

14. In a process for the manufacture of alumina spheres by commingling alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.01% to about 0.5% of hardwood tar distillate.

15. In a process for the manufacture of alumina spheres by commingling alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.01% to about 0.5% by weight of 2-tertiary butyl-4-methoxyphenol.

16. In a process for the manufacture of alumina spheres by commingling alumina sol with hexamethylene tetramine and passing droplets of the resultant mixture into a hydrocarbon oil maintained at an elevated temperature and therein causing the droplets to set to hydrogel spheres, wherein the interfacial tension between said mixture and said hydrocarbon oil decreases with use, the improvement which comprises incorporating in said hydrocarbon oil from about 0.01% to about 0.5% by weight of a p-aminophenol.

17. The process which comprises passing droplets of an inorganic oxide sol into a hydrocarbon oil suspending medium maintained at an elevated temperature and containing from about 0.0001% to about 1% by weight of an aromatic hydroxy compound, converting said sol to a gel within said suspending medium, and maintaining an inert atmosphere above said oil during the formation of the spheres.

18. The process which comprises commingling alumina sol with hexamethylene tetramine and passing droplets of the resultant mixture into a hydrocarbon oil maintained at an elevated temperature and containing from about 0.0001% to about 1% by weight of an alkylated phenol, and maintaining an inert atmosphere above said oil during the formation of the spheres.

19. The process which comprises commingling alumina sol with hexamethylene tetramine and passing droplets of the resultant mixture into a hydrocarbon oil maintained at an elevated temperature and containing from about 0.0001% to about 1% by weight of a trialkylated phenol, and maintaining an inert atmosphere above said oil during the formation of the spheres.

20. The process which comprises commingling alumina sol with hexamethylene tetramine and passing droplets of the resultant mixture into a hydrocarbon oil maintained at an elevated temperature and containing from about 0.0001% to about 1% by weight of a p-aminophenol, and maintaining an inert atmosphere above said oil during the formation of the spheres.

CHARLES WANKAT.

References Cited in the file of this patent

UNITED STATES PATENTS

| Number | Name | Date |
|---|---|---|
| 2,505,895 | Heard | May 2, 1950 |
| 2,506,316 | Pierce | May 2, 1950 |